United States Patent
Li et al.

(10) Patent No.: US 12,114,189 B2
(45) Date of Patent: Oct. 8, 2024

(54) MEASUREMENT GAP CONFIGURATION WITH MULTIPLE CARRIERS

(71) Applicant: Apple Inc., Cupertino, CA (US)

(72) Inventors: Qiming Li, Beijing (CN); Dawei Zhang, Saratoga, CA (US); Jie Cui, San Jose, CA (US); Yang Tang, San Jose, CA (US); Manasa Raghavan, Sunnyvale, CA (US); Huaning Niu, San Jose, CA (US); Xiang Chen, Campbell, CA (US)

(73) Assignee: Apple Inc., Cupertino, CA (US)

( * ) Notice: Subject to any disclaimer, the term of this patent is extended or adjusted under 35 U.S.C. 154(b) by 253 days.

(21) Appl. No.: 17/438,172

(22) PCT Filed: May 10, 2021

(86) PCT No.: PCT/CN2021/092615
§ 371 (c)(1),
(2) Date: Sep. 10, 2021

(87) PCT Pub. No.: WO2022/236531
PCT Pub. Date: Nov. 17, 2022

(65) Prior Publication Data
US 2023/0337023 A1    Oct. 19, 2023

(51) Int. Cl.
*H04W 24/08* (2009.01)
*H04W 72/0453* (2023.01)

(52) U.S. Cl.
CPC ....... *H04W 24/08* (2013.01); *H04W 72/0453* (2013.01)

(58) Field of Classification Search
CPC ..... H04L 47/10; H04L 43/50; H04L 12/2697; H04L 43/0852; H04L 43/00; H04W 24/08; H04W 72/0453

(Continued)

(56) References Cited

U.S. PATENT DOCUMENTS 11,671,886 B2 * 6/2023 Moosavi ........... H04W 74/0808
                                                          370/252
11,758,426 B2 * 9/2023 Zhu ................... H04J 11/0093
                                                          370/252

(Continued)

FOREIGN PATENT DOCUMENTS

| CN | 110536444 A | * | 12/2019 | ....... H04L 27/26025 |
| WO | WO 2020/248261 A1 | * | 12/2017 | ............ H04W 24/02 |
| WO | WO 2019/193128 A1 | * | 10/2019 | ............ H04W 24/10 |

OTHER PUBLICATIONS

3GPP TSG-RAN4 Meeting #98-e, Online, Jan. 25-Feb. 5, 2021, R4-2100221, Agenda item: 11.5.2.1, Source: Apple, Title: Consideration on preconfigured measurement gap patterns. (Year: 2021).*

(Continued)

*Primary Examiner* — Peter G Solinsky
*Assistant Examiner* — Sanjay K Dewan
(74) *Attorney, Agent, or Firm* — Kowert, Hood, Munyon, Rankin & Goetzel, P.C.

(57) ABSTRACT

Aspects are presented herein of apparatuses, systems, and methods for measurement gap configuration. A cellular network may establish communication with a UE using a first and second cell. The cellular network may configure bandwidth parts (BWPs) for the first and second cell, including a first and second BWP for the first cell and a third and fourth BWP for the second cell. A measurement gap configuration that specifies when the UE is to use a first measurement gap pattern may be provided to the UE. At a first time, the cellular network may communicate with the UE using the first BWP for the first cell and the third BWP for the second cell, based on the first measurement gap pattern. At a second time, the cellular network may communicate with the UE using the second BWP for the first cell based on a modification of the first measurement gap pattern.

20 Claims, 11 Drawing Sheets

(58) Field of Classification Search
USPC .......................................................... 370/252
See application file for complete search history.

(56) References Cited

U.S. PATENT DOCUMENTS

| | | | | |
|---|---|---|---|---|
| 2020/0288337 | A1* | 9/2020 | Callender | H04W 24/10 |
| 2023/0133908 | A1* | 5/2023 | Kumar | H04L 1/1893 |
| | | | | 370/252 |
| 2023/0262493 | A1* | 8/2023 | Ren | H04W 24/08 |
| | | | | 370/252 |

OTHER PUBLICATIONS

3GPP TSG-RAN4 Meeting #90, Athens, Greece, Feb. 25-Mar. 1, 2019, R4-1902535, Title: CR on measurement gap requirement for NE-DC for R15 (section 9.1.2) Source to WG: Intel, Source to TSG R4, Work item code: NR_newRAT-Core (Year: 2019).*

3GPP TSG RAN WG1 Meeting NR#3, Nagoya, Japan, Sep. 18-21, 2017, R1-1716647, Title: Discussion on BWP Design, Source: Convida Wireless, Agenda Item: 6.3.4. (Year: 2017).*

3GPP TSG-RAN WG4 Meeting #98-bis-e, Electronic Meeting, Apr. 12-20, 2021, R4-2107347, Source: Qualcomm CDMA Technologies, Title: Realizing pre-configured MG via network controoled fast gap (NCFG), Agenda item: 8.5.2.1, Pre-configured MG patterns [NR_MG_enh-Core) (Year: 2021).*

3GPP TSG RAN WG4 Meeting #98-e, Electronic Meeting, Jan. 25-Feb. 5, 2021, R4-2102622, Source: Qualcomm CDMA Technologies, Title: Views on pre-configured MG patterns, Agenda Item: 11.5.2.1, Pre-configured MG pattern(s), [NR_MG_enh-Core] (Year: 2021).*

3GPP TSG RAN Meeting #89e, Electronic Meeting, Sep. 14-18, 2020, RP-201687 (revision of RP-20xxxx), Agenda item: 9.1.2, Source: Qualcomm Incorporated, Title: Motivations for measurement gap enhancements WI in NR R17. (Year: 2020).*

International Search Report and Written Opinion for PCT/CN2021/092615; 9 pages; Feb. 10, 2022.

Apple "Consideration on preconfigured measurement gap patterns;" 3GPP TSG-RAN 4 Meeting #98-e R4-2100221; Feb. 5, 2021.

Intel "CR on measurement gap requirement for NE-DC for R15;" 3GPP TSG-RAN4 Meeting #90 R4-1902535; Athens, Greece; 10 pages; Mar. 1, 2019.

Convida Wireless "Discussion on BWP Design;" 3GPP TSG RAN WG1 Meeting NR#3 R1-1716647; Nagoya, Japan; 5 pages; Sep. 21, 2017.

Extended European Search Report for EP Patent Application No. 21887865.0; 14 pages; Oct. 11, 2022.

Qualcomm CDMA Technologies "Realizing pre-configured MG via network controlled fast gap (NCFG)"; 3GPP TSG-RAN WG4 Meeting #98-bis-e R4-2107347; 4 pages; Apr. 12, 2021.

Qualcomm CDMA Technologies "Views on pre-configured MG patterns"; 3GPP TSG RAN WG4 Meeting #98e R4-2102622; 3 pages; Jan. 25, 2021.

Qualcomm Inc "Motiviations for measurement gap enhancements WI in NR R17"; 3GPP TSG RAN Meeting #89e RP-201687; 5 pages; Sep. 14, 2020.

* cited by examiner

MEASUREMENT GAP CONFIGURATION WITH MULTIPLE CARRIERS

PRIORITY CLAIM INFORMATION

This application is a U.S. National Stage application of International Application No. PCT/CN2021/092615, filed May 10, 2021, titled "Measurement Gap Configuration with Multiple Carriers", which is hereby incorporated by reference in its entirety.

TECHNICAL FIELD

The present application relates to wireless devices, including apparatuses, systems, and methods for measurement gap configuration with multiple carriers.

BACKGROUND

Wireless communication systems are rapidly growing in usage. Wireless devices, particularly wireless user equipment devices (UEs), have become widespread. Additionally, there are a variety of applications (or apps) hosted on UEs that perform or depend on wireless communication, such as applications that provide messaging, email, browsing, video streaming, short video, voice streaming, real-time gaming, or various other online services.

Increased reliability in these communication systems are desirable.

SUMMARY

Aspects are presented herein of apparatuses, systems, and methods for measurement gap configuration with multiple carriers.

A UE may establish communication with a cellular network using at least a first component carrier and a second component carrier. The first component carrier may be configured with a first plurality of bandwidth parts, including a first bandwidth part and a second bandwidth part. The second component carrier may be configured with a second plurality of bandwidth parts, including a third bandwidth part and a fourth bandwidth part. The UE may receive signaling specifying at least one measurement gap pattern for the first component carrier and the second component carrier. At a first time, the UE perform one or more measurements using the at least one measurement gap pattern. At the first time, communicating using the first component carrier may use the first bandwidth part and communicating using the second component carrier may use the third bandwidth part. At a second time, the UE may communicate using the first component carrier using the second bandwidth part. In response to changing from using the first bandwidth part to using the second bandwidth part, the UE may automatically modifying the at least one measurement gap pattern. Accordingly, the UE may perform one or more measurements using the modified at least one measurement gap pattern.

A cellular network may establish communication with a UE using a first and second cell. The cellular network may configure bandwidth parts (BWPs) for the first and second cell, including a first and second BWP for the first cell and a third and fourth BWP for the second cell. A measurement gap configuration that specifies when the UE is to use a first measurement gap pattern may be provided to the UE. At a first time, the cellular network may communicate with the UE using the first BWP for the first cell and the third BWP for the second cell, based on the first measurement gap pattern. At a second time, the cellular network may communicate with the UE using the second BWP for the first cell based on a modification of the first measurement gap pattern.

In some aspects, a non-transitory memory medium may include program instructions executable by a UE that, when executed, cause the UE to perform at least a portion or all of the above operations. In some aspects, a method performed by the UE may include the UE performing the above operations. In some aspects, a method performed by a base station or network element may include the base station or network element performing corresponding operations.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the disclosed aspects can be obtained when the following detailed description is considered in conjunction with the following drawings, in which.

Figure 1:
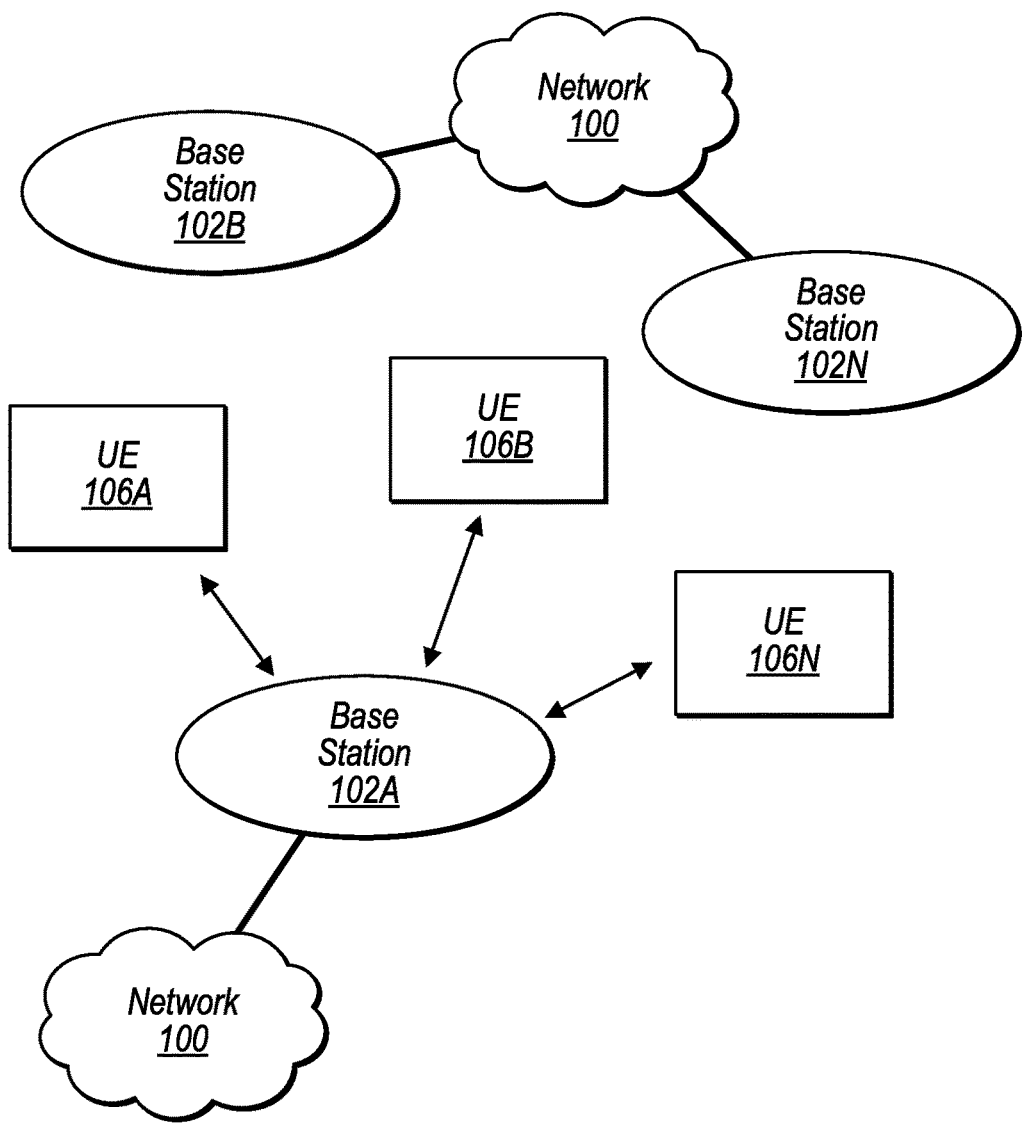
FIG. 1 illustrates an example wireless communication system, according to some aspects.

While the invention is susceptible to various modifications and alternative forms, specific aspects thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE ASPECTS

Acronyms

The following acronyms are used in the present Patent Application:

UE: User Equipment
BS: Base Station
ENB: eNodeB (Base Station)
GNB: gNodeB (Base Station)
LTE: Long Term Evolution
UMTS: Universal Mobile Telecommunications System
RAT: Radio Access Technology
RAN: Radio Access Network
E-UTRAN: Evolved UMTS Terrestrial RAN
CN: Core Network
EPC: Evolved Packet Core
MME: Mobile Management Entity
HSS: Home Subscriber Server
SGW: Serving Gateway
PS: Packet-Switched
CS: Circuit-Switched
EPS: Evolved Packet-Switched System
RRC: Radio Resource Control
IE: Information Element
QoS: Quality of Service
QoE: Quality of Experience
TFT: Traffic Flow Template
RSVP: Resource ReSerVation Protocol
API: Application programming interface Terms The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones, tablet computers, portable gaming devices, wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Figure 2:
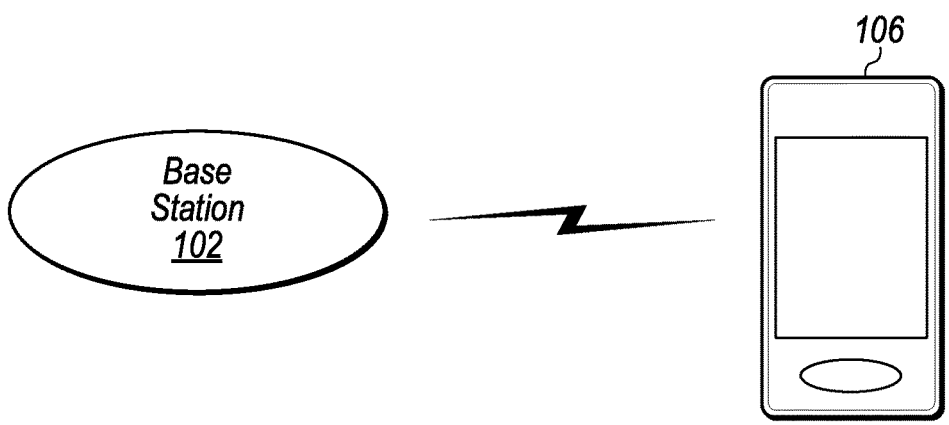
FIG. 2 illustrates a base station (BS) in communication with a user equipment (UE) device, according to some aspects.

FIGS. 1 and 2—Communication System

FIG. 1 illustrates a simplified example wireless communication system, according to some aspects. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), 6G, HSPA, 3GPP2 CDMA2000 (e.g., 1×RTT, 1×EV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as 'gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some aspects, base station 102 may be a next generation base station, e.g., a 5G New Radio (5G NR) base station, or "gNB". In some aspects, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some aspects. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method aspects described herein by executing such stored instructions. Alternatively, or in addition, the UE 106 may include a programmable hardware element such as an FPGA (field-programmable gate array) that is configured to perform any of the method aspects described herein, or any portion of any of the method aspects described herein.

The UE 106 may include one or more antennas for communicating using one or more wireless communication protocols or technologies. In some aspects, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some aspects, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
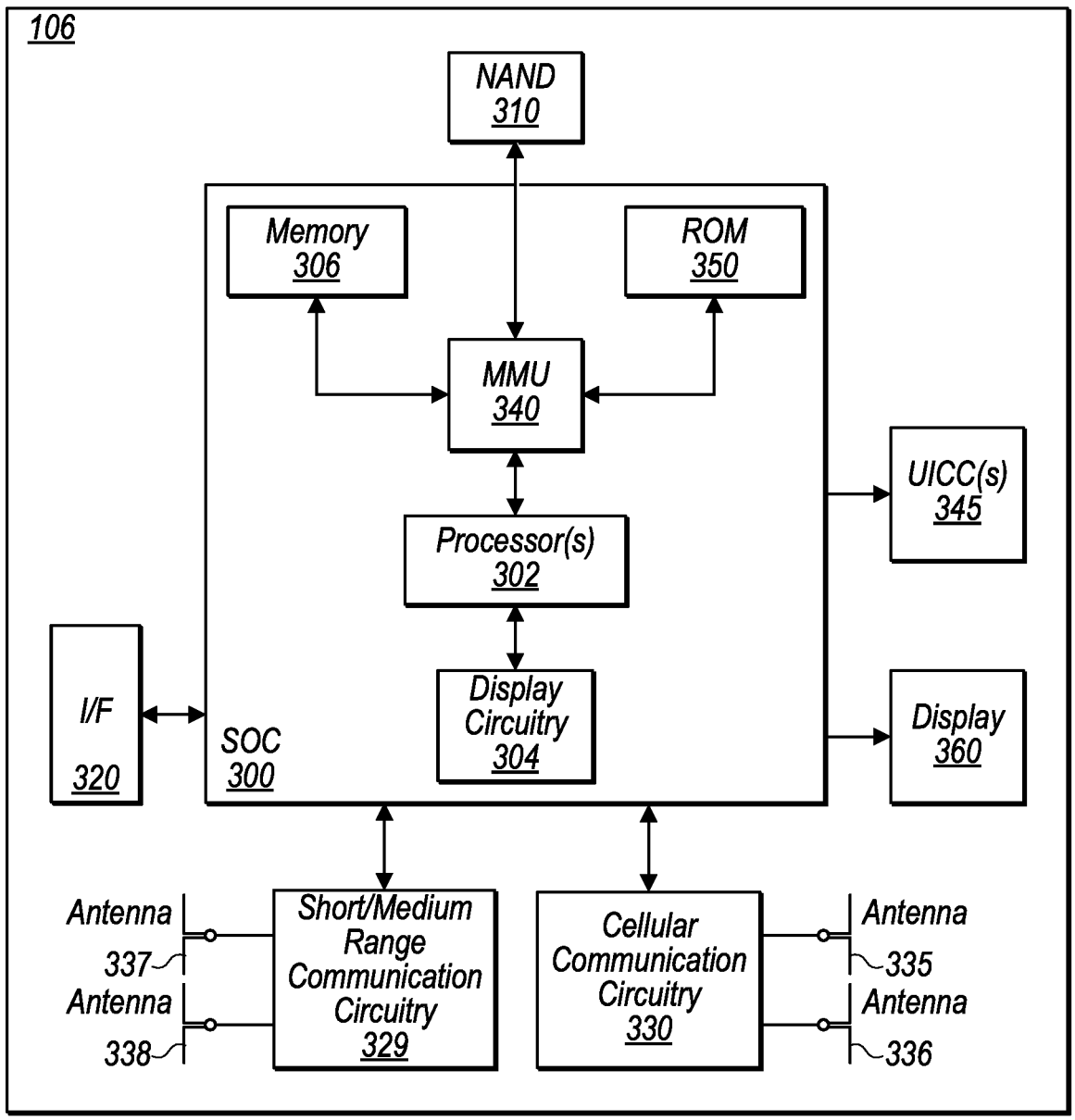
FIG. 3 illustrates an example block diagram of a UE, according to some aspects.

FIG. 3—Block Diagram of a UE

FIG. 3 illustrates an example simplified block diagram of a communication device 106, according to some aspects. It is noted that the block diagram of the communication device of FIG. 3 is only one example of a possible communication device. According to aspects, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some aspects, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some aspects, as further described below, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). In addition, in some aspects, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some aspects, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using multiplexing to perform transmissions according to multiple radio access technologies in the same frequency carrier (e.g., and/or multiple frequency carriers), as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements and/or processors. In other words, one or more processing elements or processors may be included in cellular communication circuitry 330 and, similarly, one or more processing elements or processors may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
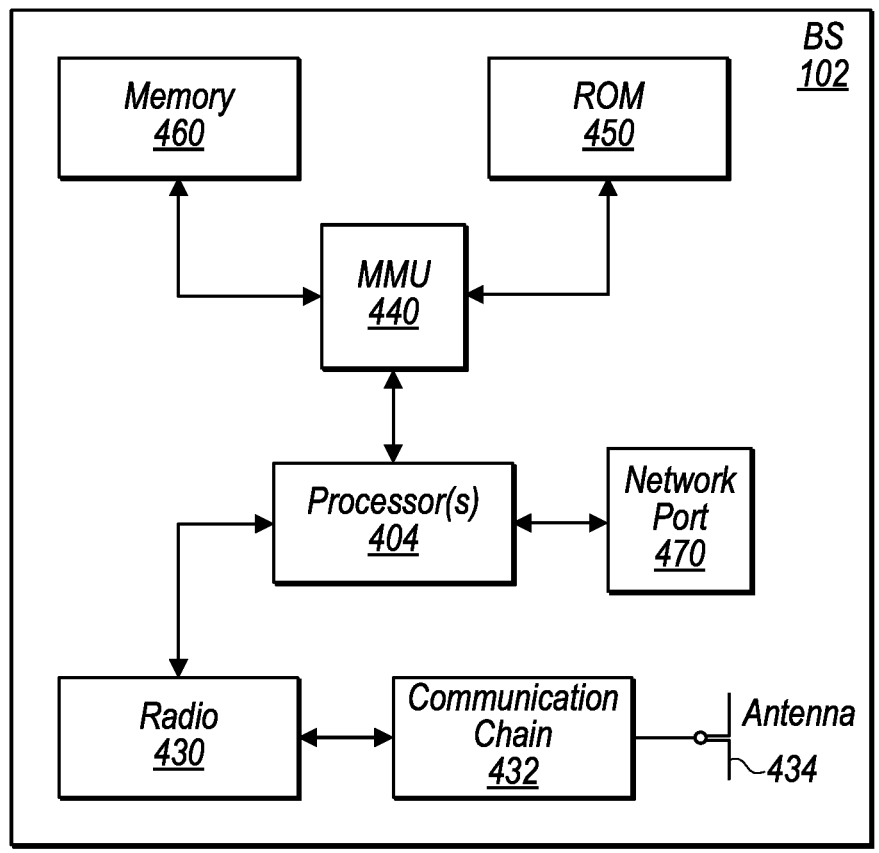
FIG. 4 illustrates an example block diagram of a BS, according to some aspects.

FIG. 4—Block Diagram of a Base Station

FIG. 4 illustrates an example block diagram of a base station 102, according to some aspects. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor (s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some aspects, base station 102 may be a next generation base station, e.g., a 5G New Radio (5G NR) base station, or "gNB". In such aspects, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The radio 430 and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
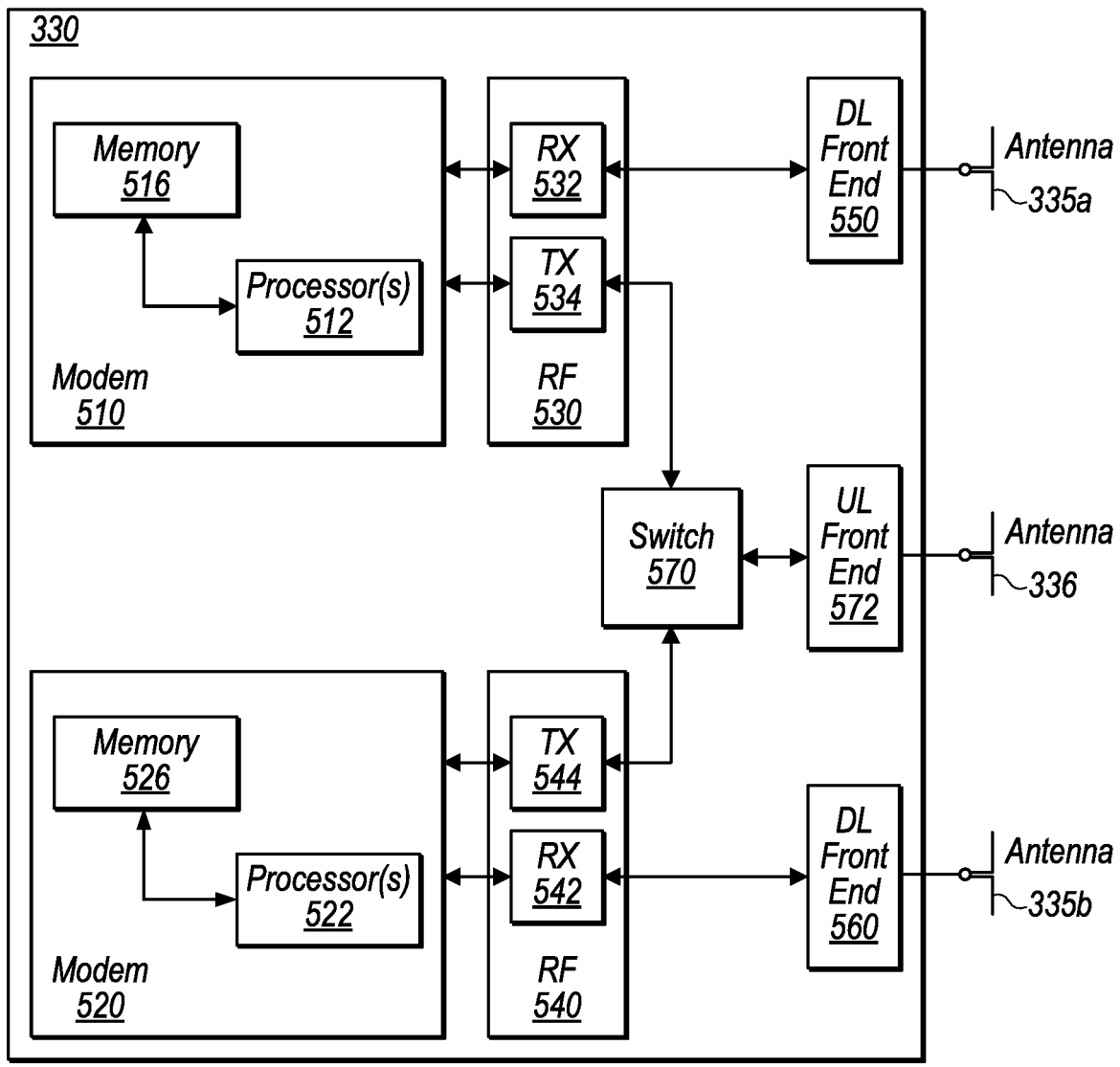
FIG. 5 illustrates an example block diagram of cellular communication circuitry, according to some aspects.

FIG. 5—Block Diagram of Cellular Communication Circuitry

FIG. 5 illustrates an example simplified block diagram of cellular communication circuitry, according to some aspects. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to aspects, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some aspects, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some aspects, receive circuitry 542 may be in communication with DL front end 560, which may include circuitry for receiving radio signals via antenna 335b.

In some aspects, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some aspects, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In some aspects, processor(s) 512, 522, etc. may be configured to implement or support implementation of part or all of the methods described herein, e.g., by executing program instructions stored on a memory medium (e.g., a non-transitory computer-readable memory medium). Alternatively, the processor(s) 512, 522, etc. may be configured as a programmable hardware element, such as an FPGA, or as an ASIC, or a combination thereof. In addition, as described herein, processor(s) 512, 522, etc. may include one or more processing elements. Thus, processor(s) 512, 522, etc. may include one or more integrated circuits (ICs) that are configured to perform the functions of processor(s) 512, 522, etc. In addition, each integrated circuit may include circuitry (e.g., first circuitry, second circuitry, etc.) configured to perform the functions of processor(s) 512, 522, etc.

As described herein, the modem 520 may include hardware and software components for implementing features for using multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

Figure 6:
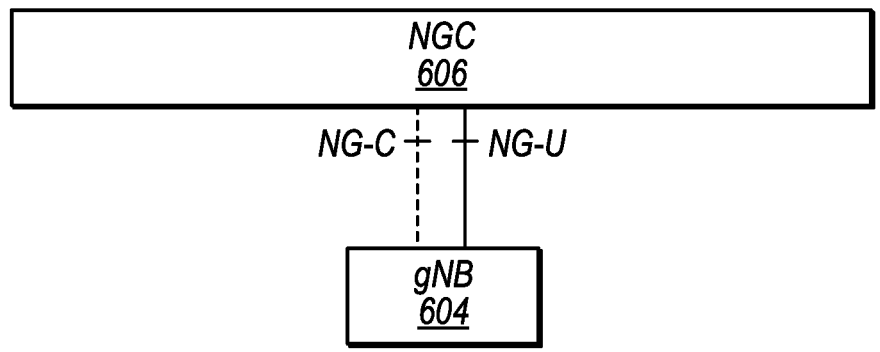
FIGS. 6 and 7 illustrate examples of a 5G NR base station (gNB), according to some aspects.
Figure 7:
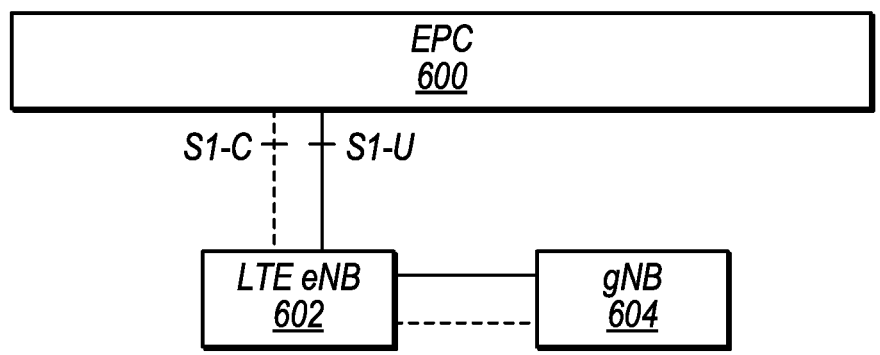

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Figure 8:
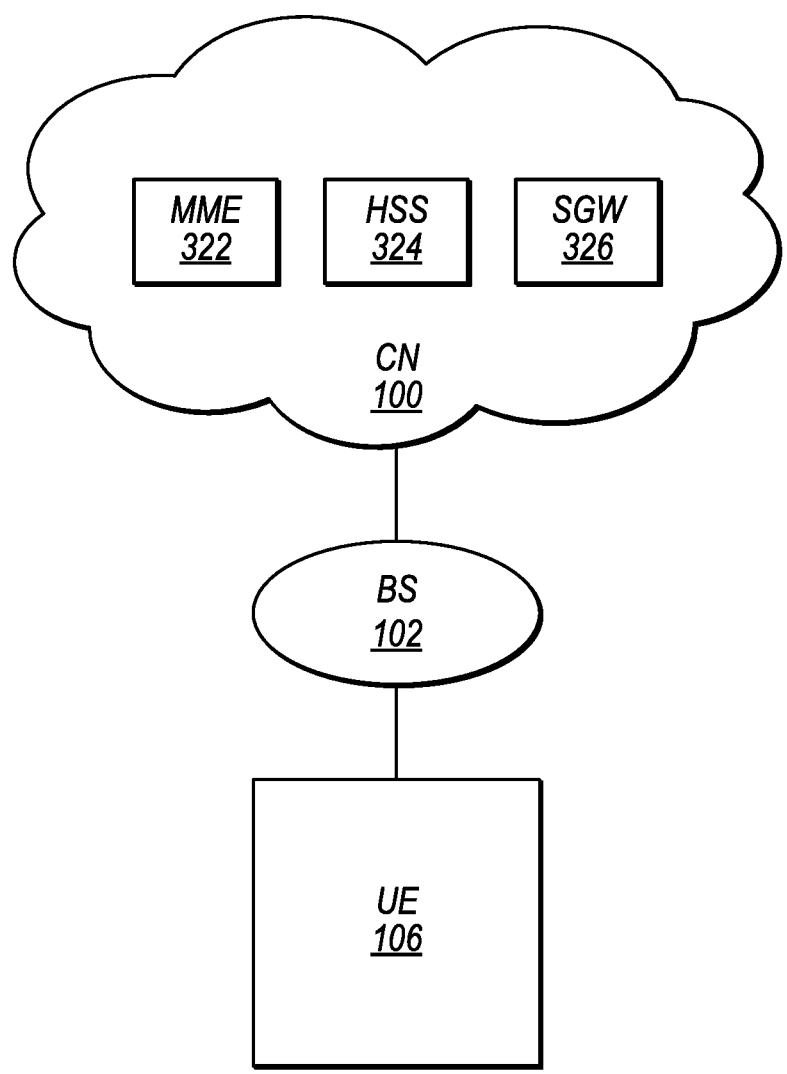
FIG. 8 illustrates an exemplary wireless network in communication with a UE, according to some aspects.

FIG. 8—Wireless Communication System

FIG. 8 illustrates an example simplified portion of a wireless communication system. The UE 106 may be in communication with a wireless network, e.g., a radio access network (RAN), which may include one or more base stations (BS) 102 and may provide connection to a core network (CN) 100, such as an evolved packet core (EPC). The base station 102 may be an eNodeB and/or gNB (e.g., a 5G or NR base station) or other type of base station. The UE 106 may communicate in a wireless manner with the base station 102. In turn, the base station 102 may be coupled to a core network 100. As shown, the CN 100 may include a mobility management entity (MME) 322, a home subscriber server (HSS) 324, and a serving gateway (SGW) 326. The CN 100 may also include various other devices known to those skilled in the art.

Operations described herein as being performed by the wireless network may be performed by one or more of the network devices shown in FIG. 8, such as one or more of the base station 102 or the CN 100, and/or the MME 322, HSS 324, or SGW 326 in the CN 100, among other possible devices. Operations described herein as being performed by the radio access network (RAN) may be performed, for example, by the base station 102, or by other components of the RAN usable to connect the UE and the CN.

Figure 9:
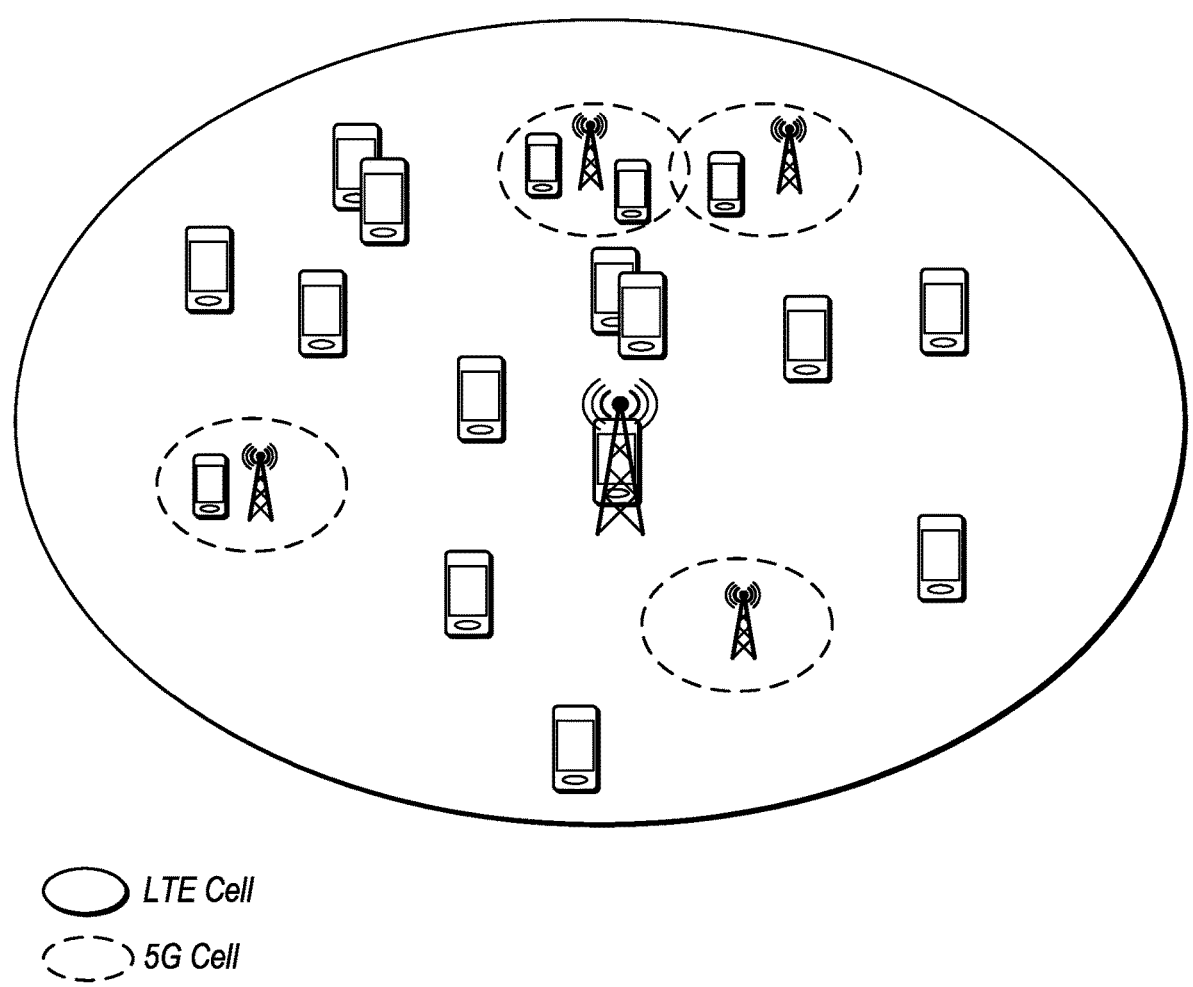
FIG. 9 is a diagram illustrating an example cell coverage scenario for macro and small cells, according to some aspects.

FIG. 9—Example Cellular Environment

FIG. 9 illustrates an example cellular environment where multiple UEs are within the range of a macro cell or an LTE cell (e.g., which may be part of a master cell group (MCG) of one or more UEs). Within the macro cell, multiple smaller cells (e.g., 5G or NR cells) may be available for providing connectivity to UE(s). The smaller cells may be secondary cells or part of a secondary cell group (SCG) of one or more UEs.

When a UE is configured with a SCG, the UE may maintain connectivity to both the MCG and the SCG. For example, for the MCG, the primary cell (PCell) may always be activated. In the SCG, the primary secondary cell (PS-Cell) may be activated or deactivated. In some aspects, the PSCell may be in an activated state or a deactivated state, e.g., based on signaling between the network and the UE.

Measurement Gap Configuration

A measurement gap may be a time period where a UE is configured to perform measurements, e.g., while suspending communication with a serving cell. The measurements performed during the measurement gap may relate to intra-frequency measurements, inter-frequency measurements, inter-RAT measurements, etc. Measurement gaps (MGs) may be performed according to a measurement gap pattern (MGP). An MGP may have a management gap repetition period (MGRP), which may be the period of time at which the measurement gap repeats, e.g., when it has a constant period. An MGP may also have a measurement gap length (MGL), which is the length of time of the measurement gap. In some embodiments, measurement gap patterns may be configured via signaling from the cellular network (e.g., the serving base station). In some embodiments, the measurement gap pattern may be configured via RRC signaling.

For example, an example configuration may include the following information elements (IEs):

```
MeasConfigMN ::= SEQUENCE {
    measuredFrequenciesMN   SEQUENCE (SIZE (1..maxMeasFreqsMN))
                            OF NR-FreqInfo
    measGapConfig           SetupRelease { GapConfig }
    gapPurpose              ENUMERATE {perUE, perFR1}
    measGapConfigFR2        SetupRelease { GapConfig }
```

In this example configuration, only per-UE gap and per-FR gap (per-FR1 and per-FR2) are supported, although other embodiments are also envisioned. In some embodiments, per-UE gap means the MG configuration applies to all the serving cells. In some embodiments, per-FR1 gap means the MG configuration applies to all the serving cells in FR1. In some embodiments, per-FR2 gap means the MG configuration applies to all the serving cells in FR2.

Whether a measurement gap is needed may depend on whether all the measurement objectives (MOs) can be measured outside of the measurement gap. For example, a measurement gap may not be needed when the reference signals (or other types of measurements) can be measured by the UE using the currently active bandwidth part (BWP) (e.g., where the measurements are in or near the same carrier frequency as the BWP). However, the situation may change when there is BWP switch, e.g., where a measurement gap may become necessary. Note that a BWP switch procedure may be performed in 1-3 ms, while reconfiguration of the measurement gap (e.g., via RRC procedure) may take up to dozens or even hundreds of ms. In other words, RRC-based measurement gap update may not be fast enough to follow a BWP switch.

In some embodiments, preconfigured measurement gap pattern(s) may be used in order to match the BWP switch timing (e.g., activation and/or deactivation of a measurement gap following a DCI or timer-based BWP switch). For example, measurement period requirements may be defined with pre-configured measurement gap pattern(s) in the presence of one or more BWP switches per measurement period.

In some embodiments, a per BWP measurement gap configuration may allow the measurement gap pattern to be dynamically updated when a BWP switch occurs. For example, different MG patterns may be pre-configured for different BWP. When there is only one active BWP for a serving cell, there may be only one active MG pattern at a time.

Measurement gaps may still be configured either per-UE or per-FR basis. In such embodiments, a new mechanism may be used to activate and/or deactivate the measurement gap when a BWP switch occurs, e.g. a new ON/OFF indicator for each BWP.

In cases involving multiple component carriers (e.g., in carrier aggregation or dual connectivity), various embodiments may be used to handle measurement gap patterns and changing BWPs.

Figure 10:
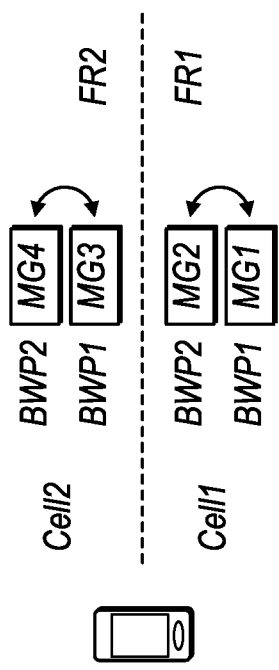
FIGS. 10-16 are diagrams illustrating various measurement gap configuration scenarios, according to some aspects.

FIG. 10—Different Measurement Gap Patterns for Different BWPs

FIG. 10 illustrates an example embodiment involving two serving cells (or component carriers) on FR1 (Cell 1) and FR2 (Cell 2). In this example embodiment, there are two configured BWPs for each Cell. For example, when the UE supports per-FR measurement gap and the associated measurement gap (or measurement gap pattern) with the active BWP of all serving cells in the same FR is the same, different measurement gap (MG) patterns may be used for the different cells in FR1 and FR2. In some embodiments, these associations of MG patterns and BWPs may be configured by the network (e.g., via the serving cells or primary serving cell), e.g., using RRC signaling. Other methods of associating the BWPs and MG patterns are also envisioned (e.g., via pre-configuration, specification in relevant standards, other signaling, etc.).

The measurement gap pattern for cell 1 and cell 2 may be independently controlled by network. For example, BWP1 in cell 1 may be the current active BWP, and BWP1 in cell 2 may be the current active BWP. Accordingly, the UE may apply MG1 on cell 1 to perform gap based measurement in FR1, while the UE may apply MG3 on cell 2 to perform gap based measurement in FR2. In this example embodiment, when BWP switch occurs on cell 1, the UE may automatically change the MG pattern in FR1 to MG2 without impact (e.g., independently) on FR2/cell 2. Similarly, when a BWP switch occurs on cell 2, the UE may automatically change the MG pattern in FR2 to MG4 without impact (e.g., independently) on FR1/cell 1. Radio resource management (RRM) measurement requirement(s) (including PSS/SSS detection, time index detection and measurement period) for each measurement or measurement objective (MO) may follow the associated MGP.

Figure 11:
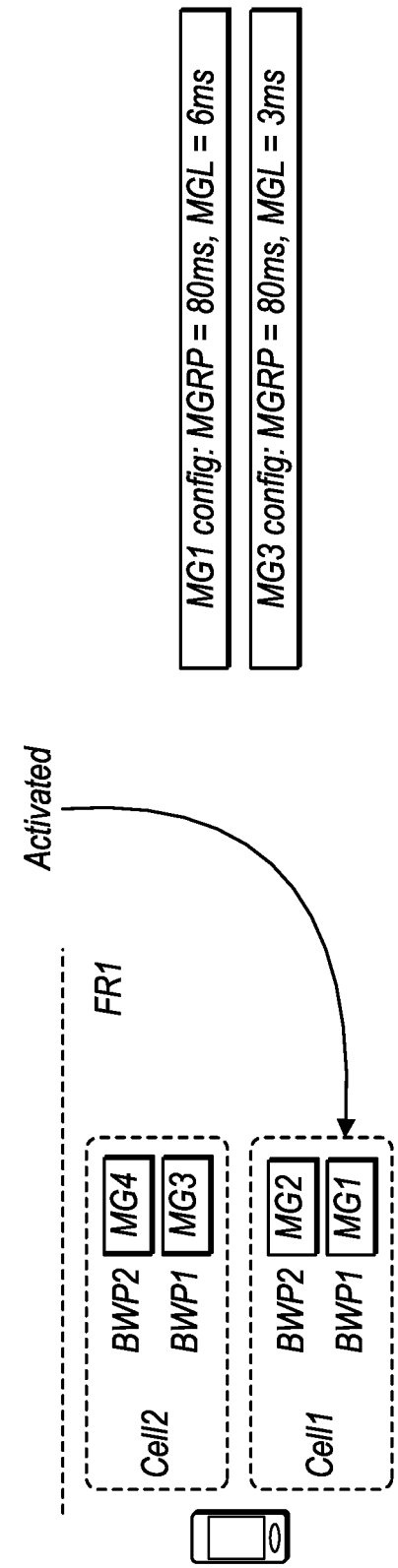
Figure 12:
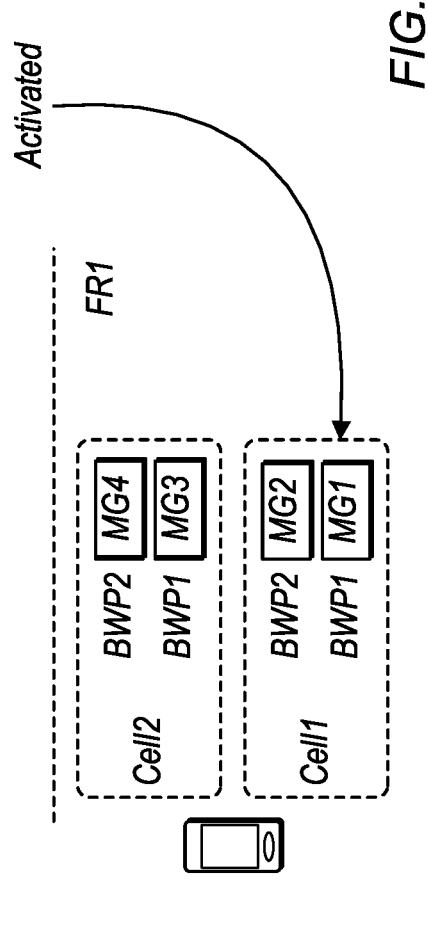

FIGS. 11 and 12—Different Measurement Gap Patterns for Different BWPs

FIGS. 11 and 12 illustrate example embodiments involving two serving cells (or component carriers) on FR1. These described embodiments may be particularly useful in situations where the UE does not support per-FR measurement gap or the UE supports per-FR measurement gap, but the measurement gap pattern is different for cells in the same FR. In some embodiments, these associations of MG patterns and BWPs may be configured by the network (e.g., via the serving cells or primary serving cell), e.g., using RRC signaling. Other methods of associating the BWPs and MG patterns are also envisioned (e.g., via pre-configuration, specification in relevant standards, other signaling, etc.).

In some embodiments, if the measurement gap offset is the same, then the measurement gap with highest measurement gap overhead may be activated. There may be a variety of manners for determining which measurement gap pattern has the highest overhead. For example, if the measurement gap repetition period (MGRP) of the measurement gap patterns are the same, then the measurement gap with the longest measurement gap length (MGL) may be activated. As another possibility, if the MGL of the measurement gap patterns are the same, then the measurement gap pattern with the shortest MGRP may be activated. Additionally, or alternatively, if both the MGRP and the MGL are different, then the MG pattern with the largest ratio between MGL and MGRP (MGL/MGRP) may be activated. Other methods for determining the highest overhead MGP are also envisioned. These selection rules may be configured by the network (e.g., in a measurement gap configuration), pre-configured by the UE (e.g., according to standards specification or specified by the manufacturer), and/or indicated in other signaling, as desired. As noted above, RRM measurement requirement(s) for each MO may follow the activated MGP.

In the example shown in FIG. 11, cell 1 and cell 2 both have BWP activated. Accordingly, the UE may need to select a single management gap pattern for FR1, which causes a selection between MG1 and MG3. In this example, MG1 and MG3 both have a periodicity of 80 ms, but the MGL of MG3 is 3 ms while the MGL of MG1 is 6 ms. Accordingly, based on the selection rules above, the UE may select (e.g., automatically) MG3 because it has the shortest MGRP. Note that if BWP2 was selected for Cell 2, the choice would be between MG1 and MG4. In other words, the choice can be made independently, regardless of which BWPs are active in each cell, as desired.

FIG. 12 illustrates an example where the UE may use a table (e.g., provided by the network, such as in a measurement gap configuration in RRC signaling) to decide between different measurement gap patterns. For example, the table may explicitly indicate which MG should be activated for every active BWP combo for all the serving cells. In the example of FIG. 12, BWP1 is the active BWP in Cell 1 and BWP2 is the active BWP in Cell 2. Using the table for this particular combination, the UE may automatically use MG1 as the MGP.

Figure 15:
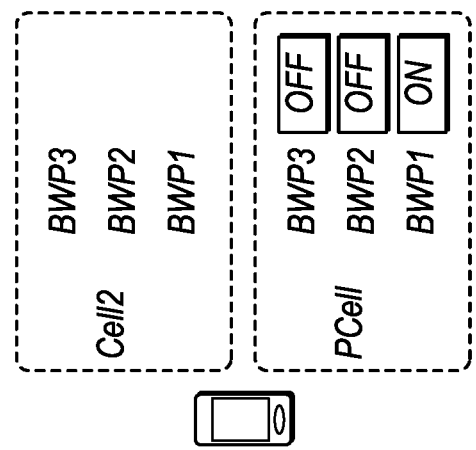
Figure 14:
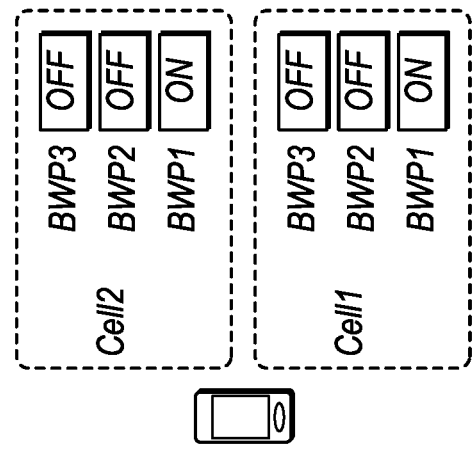
Figure 13:

FIGS. 13-15—Same Measurement Gap Pattern with Different Status

In some embodiments, a same measurement gap pattern may be used for multiple BWPs, e.g., with different status for each BWP. Such embodiments may be useful for situations where the UE is configured with per-UE or per-FR gap and a ON/OFF indication may be used to determine whether the preconfigured measurement gap pattern should be activated or deactivated.

In the example of FIG. 13, when BWP1 is active, then the measurement gap pattern may be activated; however, when the BWP2 is active, then the measurement gap pattern may be deactivated. In this example, it may be that the measurement gap is not necessary for BWP2 (e.g., because there is overlap of frequencies between BWP2 and the measurement), but may be necessary for BWP1.

Similar to embodiments described above, the measurement gap pattern may be configured by the network, e.g., indicated on a per cell or per component carrier basis. Additionally, the network may be configured to indicate the ON/OFF indication for each BWP as part of the measurement gap configuration or via other signaling (e.g., associated with BWP changes or BWP configurations), as desired.

FIG. 14 illustrates an example that extends the ON/OFF indication to multiple CCs. In this example, the measurement gap pattern may be activated if any active BWP has an associated measurement gap pattern indication. Thus, as shown in FIG. 14, if either BWP1 of Cell 1 or BWP1 of Cell 2 is active, then the measurement gap pattern may be active. However, if neither BWP1 of Cell 1 or BWP1 of Cell 2 is active, then the measurement gap pattern may be inactive.

FIG. 15 illustrates a different example for multiple component carriers. In this embodiment, the measurement gap pattern may be active only based on the bandwidth part of a particular cell. In some embodiments, the particular cell may be a special cell (SpCell), such as a primary cell (PCell), e.g., in carrier aggregation, or a primary secondary cell (PSCell), e.g., in dual connectivity. As shown in this example, when BWP1 of the specified cell (PCell) is active, the measurement gap pattern may be activated, e.g., for both cells. Otherwise, it may not. Saying this another way, if the ON/OFF indicator is introduced, then it is needed only on the SpCell. If criteria is defined, then the UE may only need to check the criteria for the SpCell to determine whether to activate or deactivate the measurement gap pattern.

As in the embodiments described above, these ON/OFF indications and measurement gap patterns can be configured at various different times using various different signals. Additionally, ON or OFF indication could apply to any or none of the configured BWPs, e.g., not just a single ON as in the provided examples.

In the embodiments of FIGS. 13-15 (as well as other embodiments), the UE may be configured to automatically enable or disable measurement gap patterns based on the various configurations, BWP activations or changes, etc.

Figure 16:
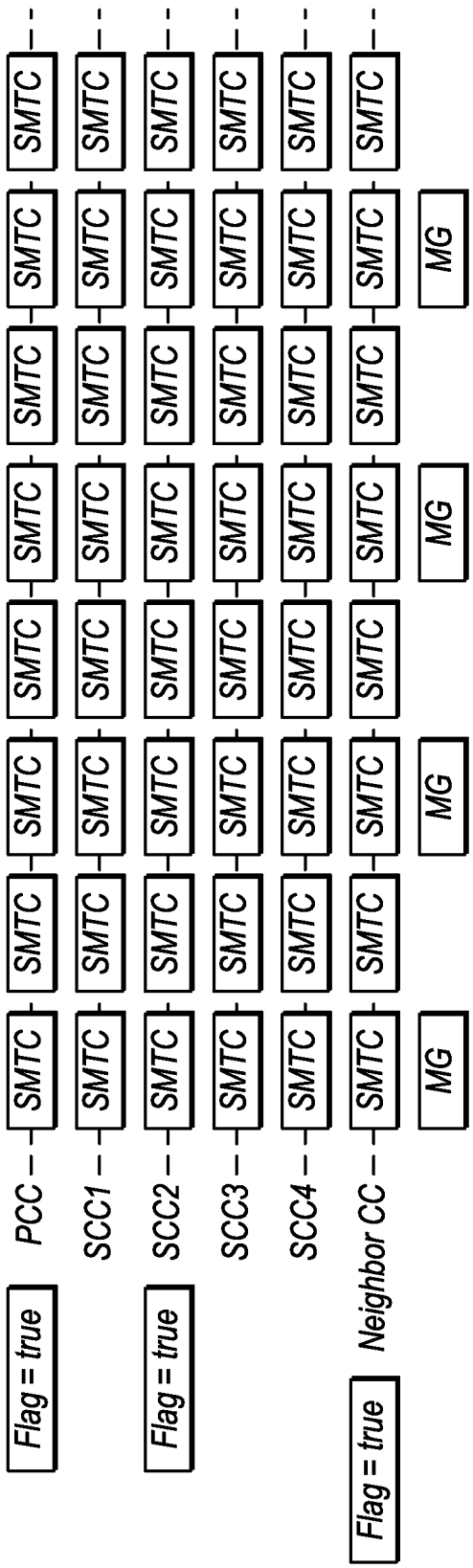

FIG. 16—Partial Overlap between SMTC and MG

In some embodiments, the measurement gap and the SSB based measurement timing configuration (SMTC) may partially overlap. In such cases, the UE may be configured to determine whether the measurement of each component carrier is performed within or outside of the measurement gap.

In some embodiments, the UE may measure all secondary component carriers (SCCs) outside of the measurement gap pattern. In some embodiments, the UE may measure the primary component carrier and/or neighbor component carrier inside the measurement gap, e.g., when it is configured.

In some embodiments, an ON/OFF indication or flag may be used for determining whether to use the measurement gap for different component carrier(s). For example, the flag may be a one bit indicator. If it is TRUE, then the measurement may be performed within the measurement gap. Otherwise, the measurement may be performed outside of the measurement gap. For example, the flag may be introduced on a per component carrier basis, per measurement objective, per FR, per UE, and/or any desired manner.

In the example of FIG. 16, the PCC, SCC2, and neighbor CC may be measured using the measurement gap, while SCC1, SCC3 and SCC4 may be measured outside of the measurement gap (e.g., during SMTC). The RRM measurement requirement for each CC may follow either SMTC requirement(s) or measurement gap requirement(s) depending on the TRUE/FALSE status of the measurement gap pattern.

The embodiment of FIG. 16 may involve a single measurement gap pattern used for multiple different component carriers or may include a plurality of different measurement gap patterns (e.g., each associated with different respective component carriers), as desired. Accordingly, the TRUE/FALSE status may activate or deactivate the single measurement gap pattern (e.g., in the case that there is only one measurement gap pattern) or may activate or deactivate the respective measurement gap pattern associated with the component carrier (e.g., in the case where multiple measurement gap patterns are specified).

Figure 17:
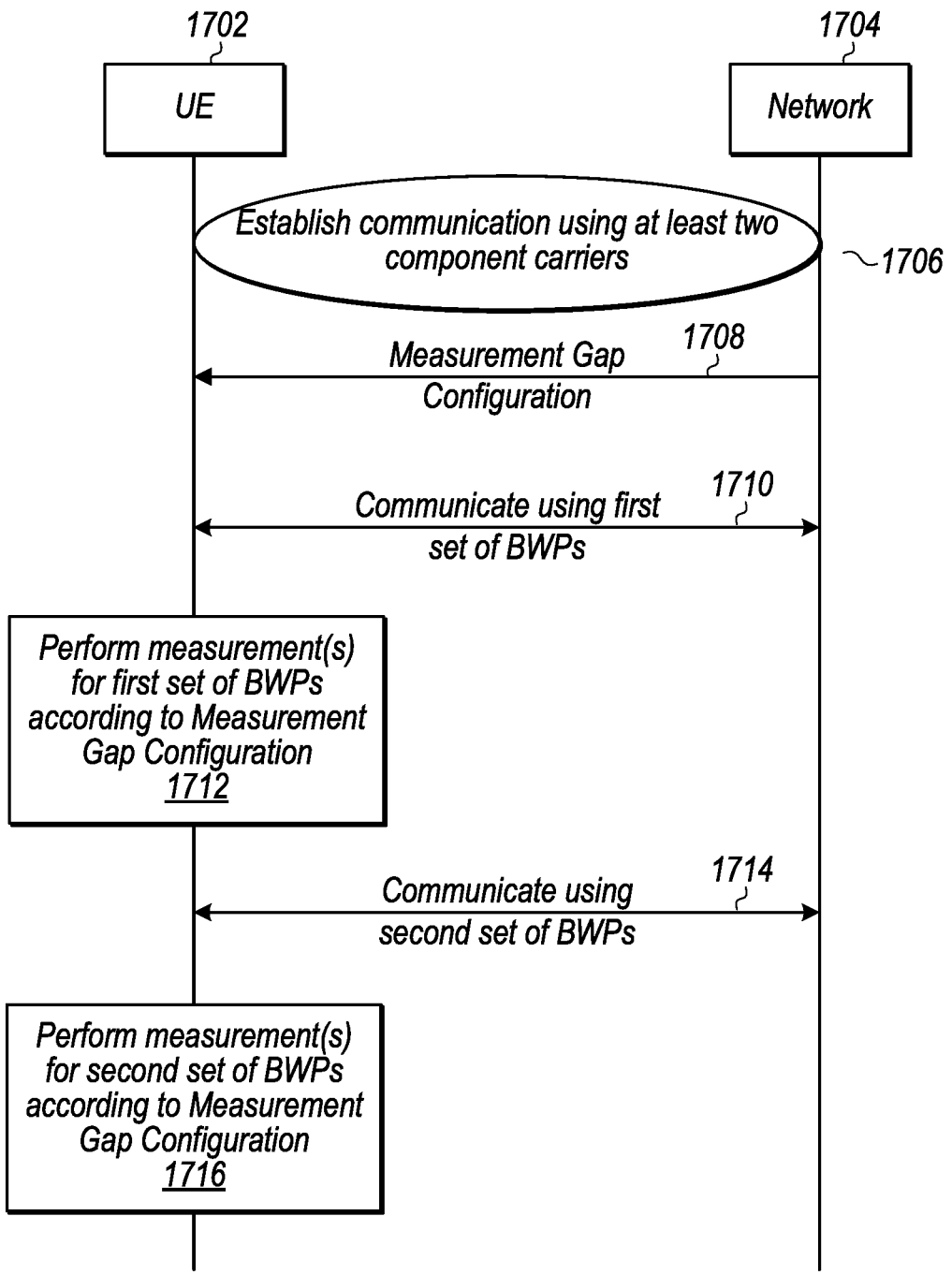
FIG. 17 is a flow chart diagram illustrating an example method for measurement gap configuration, according to some aspects.

FIG. 17—Measurement Gap Configuration

FIG. 17 illustrates an example flow chart for measurement gap configuration. Aspects of the method of FIG. 17 may be implemented by a wireless device, such as the UE(s) 106, in communication with a network, e.g., via one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 302, baseband processor(s), processor(s) associated with communication circuitry, etc., among various possibilities) may cause the UE to perform some or all of the illustrated method elements. Similarly, one or more processors (or processing elements) of the BS (e.g., processor(s) 404, baseband processor(s), processor(s) associated with communication circuitry, etc., among various possibilities) may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various aspects, some of the elements of the methods shown may be performed concurrently, in a different order than shown, may be substituted for by other method elements, or may be omitted. Additional method elements may also be performed as desired. As shown, the method may operate as follows.

In 1706, a UE 1702 may establish communication with a cellular network 1704. The communication may involve at least two component carriers or cells (e.g., which may be used interchangeably throughout). The communication between the UE 1702 and the cellular network 1704 may involve one or more base stations. In some embodiments, the UE may communicate with a base station using multiple component carriers using carrier aggregation. In some embodiments, the UE may communicate with a plurality of base stations using multiple component carriers or cells of at least two different base stations, e.g., dual connectivity. For example, the UE may communicate with a master cell group (MCG) base station using at least a first component carrier and may communicate with a secondary cell group (SCG) base station using at least a second component carrier. In embodiments involving multiple base stations, the message flow (e.g., shown in FIG. 17) between the UE and the cellular network may be via a single base station (e.g., the MCG) or a plurality of base stations (e.g., where the MCG and the SCG both are involved in communication).

Establishing communication may include the cellular network configuring one or more bandwidth parts (BWPs) for each component carrier. In some embodiments, a plurality (or all) of the component carriers may be configured with a plurality of respective BWPs (e.g., including uplink BWPs and/or downlink BWPs). For example, the network (e.g., one or more of the base stations) may configure the BWPs for at least some of the component carrier(s) via RRC signaling (e.g., an RRC reconfiguration message). The RRC signaling may include various information elements (IEs) that configure the BWPs for the component carrier(s).

In 1708, the network may provide a measurement gap configuration. As noted above, the measurement gap configuration may be provided via RRC signaling (e.g., an RRC reconfiguration message). The measurement gap configuration may be provided at the same time or at a different time than the component carrier configuration and/or the BWP configuration.

The measurement gap configuration may indicate a per-UE, per-FR1, and/or per-FR2 configuration, among other possibilities. The measurement gap configuration may indicate one or more measurement gap patterns, e.g., each including a measurement gap repetition period (MGRP) and/or measurement gap length (MGL).

As noted above, in some embodiments, the measurement gap patterns may be associated with one or more BWPs. For example, the network may configure each BWP with a respective measurement gap pattern, e.g., where, in response to a change of BWP from a first BWP to a second BWP, the UE can automatically switch from using a first measurement gap pattern associated with a first BWP to using a second measurement gap pattern associated with a second BWP.

In some embodiments (e.g., when multiple component carriers are in the same frequency range), the UE may be configured to choose between a plurality of different measurement gap patterns associated with currently active BWPs when only a single measurement gap pattern can be used. For example, the UE may automatically select the measurement gap pattern with the highest overhead. Other algorithms for selecting between different measurement gap patterns are also envisioned. Additionally, or alternatively, the cellular network may provide a table that specifies which measurement gap pattern to use with each combination of current active BWPs. Such a table could be provided at various times, e.g., at the time of BWP configuration, measurement gap configuration, and/or other times.

In some embodiments, the network may configure measurement gap patterns that are less than the number of BWPs. For example, a single measurement gap pattern may be available, and it may be associated with one or more of the BWPs (e.g., less than the total number of BWPs). In some embodiments, a measurement gap pattern may be used when any of a set of indicated BWPs (e.g., across multiple component carriers) are active, but may not be used otherwise. The indications (or associations) between the BWP(s) and the measurement gap pattern(s) may be specified at various times or via various signaling, e.g., within the measurement gap configuration, BWP configuration, or other later signaling in a more dynamic fashion, as desired.

In some embodiments, a measurement gap pattern may only be associated with the BWPs of a subset of the component carriers (e.g., a special cell such as a PCell in CA or a PSCell in DC). In such embodiments, changes of BWPs of other component carriers may not result in any change in measurement gap pattern. However, if there is a change in the BWP of the subset (e.g., one or more component carriers), the UE may automatically change the measurement gap pattern (e.g., activating the measurement gap pattern, deactivating the measurement gap pattern, changing to a different measurement gap pattern, modifying parameters of the measurement gap pattern, etc.).

In some embodiments, the network may configure whether a measurement gap is needed for certain component carriers or otherwise if measurements can be performed during other activities (e.g., SMTC). For example, if the network indicates that a measurement gap is used for a first component carrier but is not used for a second component carrier, then the UE may automatically use the associated measurement gap pattern for the first component carrier, but may not use a measurement gap pattern for the second component carrier. The indication of whether to use a measurement gap pattern may be separate from the specification of the measurement gap pattern. For example, a single measurement gap pattern could be indicated as used or not for a plurality of component carriers. Additionally, or alternatively, different measurement gap patterns may be indicated as used or not for respective component carriers. For example, if MG1 is associated with a first component carrier and MG2 is associated with a third component carrier, an indication to use a measurement gap pattern for the first component carrier, not to use a measurement gap pattern for a second component carrier, and to use a measurement gap pattern for the third component carrier would result in MG1 for the first CC, no MG for the second CC, and MG2 for the third CC.

Accordingly, in 1710, the UE may communicate using a first set of BWPs at a first time. Based on the measurement gap configuration, the UE may use the configured measurement gap patterns for that first set of BWPs to perform measurements in 1712.

In 1714, at a second time, the UE and the network may begin communicating using a second set of BWPs, different from the first set of BWPs. For example, a first component carrier may switch from using a first BWP to using a second BWP. The change in BWPs may be performed for various different reasons. The network may provide signaling to the UE to indicate to change BWPs. The BWPs may change automatically based on data transmissions, signal quality changes, power constraints of the UE, etc.

Regardless of the reason for the BWP change, the UE may automatically modify the measurement gap pattern based on the change of BWP(s). The second set of BWPs may involve a single BWP change or more than one BWP change, e.g., where a second component carrier also changes to using a different BWP. The measurement gap pattern used may be based on any or all of the BWP switches, depending on the implementation used by the UE.

Accordingly, in 1716, the UE may perform measurements for the changed BWPs using modified measurement gap pattern(s). The modification of the gap patterns may include switching from one measurement gap pattern to another, activating a deactivated measurement gap pattern, deactivating an activated measurement gap pattern, and/or changing parameters of a measurement gap pattern, among other possibilities.

Exemplary Aspects

The following descriptions provide exemplary aspects corresponding to various aspects described herein.

Example 1. An apparatus, comprising: at least one processor, wherein the at least one processor is configured to cause a user equipment (UE) to: establish communication with a cellular network using at least a first component carrier and a second component carrier, wherein the first component carrier is configured with a first plurality of bandwidth parts, including a first bandwidth part and a second bandwidth part, and wherein the second component carrier is configured with a second plurality of bandwidth parts, including a third bandwidth part and a fourth bandwidth part; receive signaling specifying at least one measurement gap pattern for the first component carrier and the second component carrier; at a first time, perform one or more measurements using the at least one measurement gap pattern, wherein at the first time, communicating using the first component carrier uses the first bandwidth part and communicating using the second component carrier uses the third bandwidth part; at a second time, communicate using the first component carrier using the second bandwidth part; in response to changing from using the first bandwidth part to using the second bandwidth part, automatically modifying the at least one measurement gap pattern; and perform one or more measurements using the modified at least one measurement gap pattern.

Example 2. The apparatus of Example 1, wherein the signaling specifying the at least one measurement gap pattern specifies a first measurement gap pattern for the first bandwidth part, a second measurement gap pattern for the second bandwidth part, a third measurement gap pattern for the third bandwidth part, and a fourth measurement gap pattern for the fourth bandwidth part; wherein said automatically modifying the at least one measurement gap pattern comprises switching from using the first measurement gap pattern to using the second measurement gap pattern.

Example 3. The apparatus of Example 2, wherein the at least one processor is further configured to: at a third time, communicate using the second component carrier using the fourth bandwidth part; in response to changing from using the third bandwidth part to using the fourth bandwidth part, automatically switch from using the third measurement gap pattern to using the fourth measurement gap pattern; and perform one or more measurements using the fourth measurement gap pattern.

Example 4. The apparatus of Example 2, wherein the signaling specifying the at least one measurement gap pattern specifies a first measurement gap pattern for the first bandwidth part, a second measurement gap pattern for the second bandwidth part, a third measurement gap pattern for the third bandwidth part, and a fourth measurement gap pattern for the fourth bandwidth part; wherein the at least one processor is further configured to: at the second time, communicate using the second component carrier using the fourth bandwidth part; in response to communicating using the first component carrier using the second bandwidth part and communicating using the second component carrier using the fourth bandwidth part, compare the second measurement gap pattern and the fourth measurement gap pattern; and based on the comparison, determine to use the second measurement gap pattern for both the first component carrier and the second component carrier.

Example 5. The apparatus of Example 4, wherein said comparing and said determining is performed by determining a highest measurement gap pattern overhead between the second measurement gap pattern and the fourth measurement gap pattern.

Example 6. The apparatus of Example 4, wherein the at least one processor is configured to: receive a table indicating which measurement gap pattern to use for different activated bandwidth parts; wherein said comparing and said determining is performed based on the table.

Example 7. The apparatus of any of Examples 1-6, wherein the signaling specifying the at least one measurement gap pattern for the first component carrier and the second component carrier indicates that a first measurement gap pattern is used when the first bandwidth part is used for the first component carrier or when the third bandwidth part is used for the second component carrier; wherein the at least one processor is further configured to at the second time, communicate using the second component carrier using the fourth bandwidth part; wherein said automatically modifying the at least one measurement gap pattern is performed in response to changing from using the first bandwidth part to using the second bandwidth part and changing from using the third bandwidth part to using the fourth bandwidth part; wherein said automatically modifying the at least one measurement gap pattern includes disabling the first measurement gap pattern; and wherein said performing one or more measurements using the modified at least one measurement gap pattern comprises performing the one or more measurements without using a measurement gap.

Example 8. The apparatus of any of Examples 1-7, wherein the signaling specifying the at least one measurement gap pattern for the first component carrier and the second component carrier indicates that a first measurement gap pattern is used when the first bandwidth part is used for the first component carrier irrespective of the bandwidth part used for the second component carrier; wherein the at least one processor is further configured to at the second time, communicate using the second component carrier using the third bandwidth part; wherein said automatically modifying the at least one measurement gap pattern is performed in response to changing from using the first bandwidth part to using the second bandwidth part; wherein said automatically modifying the at least one measurement gap pattern includes disabling the first measurement gap pattern; and wherein said performing one or more measurements using the modified at least one measurement gap pattern comprises performing the one or more measurements without using a measurement gap.

Example 9. The apparatus of any of Examples 1-8, wherein the signaling specifying the at least one measurement gap pattern for the first component carrier and the second component carrier indicates that a first measurement gap pattern is used for the first component carrier but no measurement gap pattern is used for the second component carrier.

Example 10. A wireless device, comprising: wireless communication circuitry; and at least one processor coupled to the wireless communication circuitry, wherein the at least one processor is configured to cause the wireless device to: establish communication with a cellular network using at least a first cell and a second cell, wherein the first cell is configured with a first plurality of bandwidth parts, including a first bandwidth part and a second bandwidth part, and wherein the second cell is configured with a second plurality of bandwidth parts, including a third bandwidth part and a fourth bandwidth part; receive signaling specifying at least one measurement gap pattern for the first cell and the second cell; at a first time, perform one or more measurements using the at least one measurement gap pattern, wherein at the first time, communicating over the first cell uses the first bandwidth part and communicating over the second cell uses the third bandwidth part; at a second time, communicate over the first cell using the second bandwidth part; in response to changing from using the first bandwidth part to using the second bandwidth part, automatically modifying the at least one measurement gap pattern; and perform one or more measurements using the modified at least one measurement gap pattern.

Example 11. The wireless device of Example 10, wherein the signaling specifying the at least one measurement gap pattern specifies a first measurement gap pattern for the first bandwidth part, a second measurement gap pattern for the second bandwidth part, a third measurement gap pattern for the third bandwidth part, and a fourth measurement gap pattern for the fourth bandwidth part; wherein said automatically modifying the at least one measurement gap pattern comprises switching from using the first measurement gap pattern to using the second measurement gap pattern.

Example 12. The wireless device of Example 11, wherein the at least one processor is further configured to: at a third time, communicate over the second cell using the fourth bandwidth part; in response to changing from using the third bandwidth part to using the fourth bandwidth part, automatically switch from using the third measurement gap pattern to using the fourth measurement gap pattern; and perform one or more measurements using the fourth measurement gap pattern.

Example 13. The wireless device of Example 11, wherein the signaling specifying the at least one measurement gap pattern specifies a first measurement gap pattern for the first bandwidth part, a second measurement gap pattern for the second bandwidth part, a third measurement gap pattern for the third bandwidth part, and a fourth measurement gap pattern for the fourth bandwidth part; wherein the at least one processor is further configured to: at the second time, communicate over the second cell using the fourth bandwidth part; in response to communicating over the first cell using the second bandwidth part and communicating over the second cell using the fourth bandwidth part, compare the second measurement gap pattern and the fourth measurement gap pattern; and based on the comparison, determine to use the second measurement gap pattern for both the first cell and the second cell.

Example 14. The wireless device of Example 10, wherein the signaling specifying the at least one measurement gap pattern for the first cell and the second cell indicates that a first measurement gap pattern is used when the first bandwidth part is used for the first cell or when the third bandwidth part is used for the second cell; wherein the at least one processor is further configured to at the second time, communicate over the second cell using the fourth bandwidth part; wherein said automatically modifying the at least one measurement gap pattern is performed in response to changing from using the first bandwidth part to using the second bandwidth part and changing from using the third bandwidth part to using the fourth bandwidth part; wherein said automatically modifying the at least one measurement gap pattern includes disabling the first measurement gap pattern; and wherein said performing one or more measurements using the modified at least one measurement gap pattern comprises performing the one or more measurements without using a measurement gap.

Example 15. The wireless device of Example 10, wherein the signaling specifying the at least one measurement gap pattern for the first cell and the second cell indicates that a first measurement gap pattern is used when the first bandwidth part is used for the first cell irrespective of the bandwidth part used for the second cell; wherein the at least one processor is further configured to at the second time, communicate over the second cell using the third bandwidth part; wherein said automatically modifying the at least one measurement gap pattern is performed in response to changing from using the first bandwidth part to using the second bandwidth part; wherein said automatically modifying the at least one measurement gap pattern includes disabling the first measurement gap pattern; and wherein said performing one or more measurements using the modified at least one measurement gap pattern comprises performing the one or more measurements without using a measurement gap.

Example 16. A method for operating a cellular network, comprising: establishing communication with a user equipment (UE), wherein the communication includes a first cell and a second cell; configuring a plurality of bandwidth parts for the first cell, including a first bandwidth part and a second bandwidth part; configuring a plurality of bandwidth parts for the second cell, including a third bandwidth part and a fourth bandwidth part; providing a measurement gap configuration to the UE, wherein the measurement gap configuration specifies a first measurement gap pattern, and wherein the measurement gap configuration specifies when the UE is to use the first measurement gap pattern; at a first time, communicating with the UE using the first bandwidth part for the first cell and the third bandwidth part for the second cell, wherein said communicating at the first time is based on the first measurement gap pattern; and at a second time, communicating with the UE using the second bandwidth part for the first cell, wherein said communicating at the second time is performed based on a modification of the first measurement gap pattern, wherein the modification of the first measurement gap pattern is indicated by the measurement gap configuration.

Example 17. The method of Example 16, wherein the method is performed by a base station.

Example 18. The method of Example 16, wherein communication over the first cell is performed by a first base station and wherein communication over the second cell is performed by a second base station.

Example 19. The method of any of Examples 16-18, wherein the measurement gap configuration specifies a second measurement gap pattern, wherein at the second time, the modification of the first measurement gap pattern is the second measurement gap pattern.

Example 20. The method of any of Examples 16-19, wherein the modification of the first measurement gap pattern comprises disabling the first measurement gap pattern.

Aspects of the present disclosure may be realized in any of various forms. For example, some aspects may be realized as a computer-implemented method, a computer-readable memory medium, or a computer system. Other aspects may be realized using one or more custom-designed hardware devices such as ASICs. Still other aspects may be realized using one or more programmable hardware elements such as FPGAs.

In some aspects, a non-transitory computer-readable memory medium may be configured so that it stores program instructions and/or data, where the program instructions, if executed by a computer system, cause the computer system to perform a method, e.g., any of a method aspects described herein, or, any combination of the method aspects described herein, or, any subset of any of the method aspects described herein, or, any combination of such subsets.

In some aspects, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method aspects described herein (or, any combination of the method aspects described herein, or, any subset of any of the method aspects described herein, or, any combination of such subsets). The device may be realized in any of various forms.

In some aspects, a device includes: an antenna; a radio coupled to the antenna; and a processing element coupled to the radio. The device may be configured to implement any of the method aspects described above.

In some aspects, a memory medium may store program instructions that, when executed, cause a device to implement any of the method aspects described above.

In some aspects, an apparatus includes: at least one processor (e.g., in communication with a memory), that is configured to implement any of the method aspects described above.

In some aspects, a method includes any action or combination of actions as substantially described herein in the Detailed Description and claims.

In some aspects, a method is performed as substantially described herein with reference to each or any combination of the Figures contained herein, with reference to each or any combination of paragraphs in the Detailed Description, with reference to each or any combination of Figures and/or Detailed Description, or with reference to each or any combination of the claims.

In some aspects, a wireless device is configured to perform any action or combination of actions as substantially described herein in the Detailed Description, Figures, and/or claims.

In some aspects, a wireless device includes any component or combination of components as described herein in the Detailed Description and/or Figures as included in a wireless device.

In some aspects, a non-volatile computer-readable medium may store instructions that, when executed, cause the performance of any action or combination of actions as substantially described herein in the Detailed Description and/or Figures.

In some aspects, an integrated circuit is configured to perform any action or combination of actions as substantially described herein in the Detailed Description and/or Figures.

In some aspects, a mobile station is configured to perform any action or combination of actions as substantially described herein in the Detailed Description and/or Figures.

In some aspects, a mobile station includes any component or combination of components as described herein in the Detailed Description and/or Figures as included in a mobile station.

In some aspects, a mobile device is configured to perform any action or combination of actions as substantially described herein in the Detailed Description and/or Figures.

In some aspects, a mobile device includes any component or combination of components as described herein in the Detailed Description and/or Figures as included in a mobile device.

In some aspects, a network node is configured to perform any action or combination of actions as substantially described herein in the Detailed Description and/or Figures.

In some aspects, a network node includes any component or combination of components as described herein in the Detailed Description and/or Figures as included in a mobile device.

In some aspects, a base station is configured to perform any action or combination of actions as substantially described herein in the Detailed Description and/or Figures.

In some aspects, a base station includes any component or combination of components as described herein in the Detailed Description and/or Figures as included in a mobile device.

In some aspects, a 5G NR network node or base station is configured to perform any action or combination of actions as substantially described herein in the Detailed Description and/or Figures.

In some aspects, a 5G NR network node or base station includes any component or combination of components as described herein in the Detailed Description and/or Figures as included in a mobile device.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A processor, the processor configured to perform operations, the operations comprising:
   establishing communication with a cellular network using at least a first component carrier and a second component carrier of a plurality of component carriers, wherein the first component carrier is configured with a first plurality of BWPs (BWPs), including a first BWP and a second BWP, and wherein the second component carrier is configured with a second plurality of BWP, including a third BWP and a fourth BWP;
   receiving signaling specifying a plurality of measurement gap patterns and an ON/OFF indication for respective BWPs of the first plurality of BWPs for the plurality of measurement gap patterns;
   at a first time, performing one or more measurements using at least a first measurement gap pattern of the plurality of measurement gap patterns, wherein at the first time, communicating using the first component carrier uses the first BWP and communicating using the second component carrier uses the third BWP, wherein the first and third BWPs are active BWPs;
   at a second time, changing the active BWP of the first component carrier from the first to the second BWP and communicating using the first component carrier using the second BWP;
   in response to changing the active BWP from the first BWP to the second BWP, determining whether a second measurement gap pattern of the plurality of measurement gap patterns is active, wherein the second measurement gap pattern is active when it corresponds to an ON indication in any active BWP of the plurality of BWPs of the plurality of component carriers; and
   when the second measurement gap pattern is determined to be active, performing one or more measurements using at least the second measurement gap pattern.

2. The processor of claim 1,
   wherein the signaling specifying the plurality of measurement gap patterns specifies an ON indication for the first measurement gap pattern for the first BWP, and an ON indication for the second measurement gap pattern for the second BWP.

3. The processor of claim 1, the operations further comprising:
   at a third time, communicating using the second component carrier using the fourth BWP;
   in response to changing from using the third BWP to using the fourth BWP, automatically switching from using a third measurement gap pattern to using a fourth measurement gap pattern based on the ON/OFF indication of the fourth measuring gap pattern; and
   performing one or more measurements using the fourth measurement gap pattern.

4. The processor of claim 3,
   wherein the signaling specifying the plurality of measurement gap patterns specifies an ON indication for the first measurement gap pattern for the first BWP, an ON indication for the second measurement gap pattern for the second BWP, an ON indication for the third measurement gap pattern for the third BWP, and an ON indication for the fourth measurement gap pattern for the fourth BWP;
   the operations further comprising:
   at the second time, communicating using the second component carrier using the fourth BWP;
   in response to communicating using the first component carrier using the second BWP and communicating using the second component carrier using the fourth BWP, comparing the second measurement gap pattern and the fourth measurement gap pattern; and
   based on said comparing the second measurement gap pattern and the fourth measurement gap pattern, determining to use the second measurement gap pattern for both the first component carrier and the second component carrier.

5. The processor of claim 4, wherein said comparing and said determining is performed by determining a highest measurement gap pattern overhead between the second measurement gap pattern and the fourth measurement gap pattern.

6. The processor of claim 4, the operations further comprising:
   receiving a table indicating which measurement gap pattern to use for different activated BWPs;
   wherein said comparing and said determining is performed based on the table.

7. The processor of claim 1,
   wherein the signaling specifying the plurality of measurement gap patterns for the first component carrier and the second component carrier indicates that the first measurement gap pattern is used when the first BWP is active for the first component carrier or when the third BWP is active for the second component carrier;
   the operations further comprising at the second time, communicate using the second component carrier using the fourth BWP;
   the operations further comprising, in response to changing the active BWP from the first BWP to the second BWP, disabling the first measurement gap pattern; and wherein said performing one or more measurements using at least the second measurement gap pattern comprises performing the one or more measurements without using a measurement gap.

8. The processor of claim 1, wherein the signaling specifying the plurality of measurement gap patterns for the first component carrier and the second component carrier indicates that a first measurement gap pattern is used when the first BWP is active for the first component carrier irrespective of the BWP active for the second component carrier;
the operations further comprising at the second time, communicate using the second component carrier using the third BWP;
wherein said determining whether a second measurement gap pattern of the plurality of measurement gap patterns is active is performed in response to changing the active BWP from the first BWP to the second BWP;
the operations further comprising disabling the first measurement gap pattern; and
wherein said performing one or more measurements at least the second measurement gap pattern comprises performing the one or more measurements without using a measurement gap.

9. The processor of claim 1, wherein the signaling specifying the plurality of measurement gap patterns for the first component carrier and the second component carrier indicates an ON indication for the first measurement gap pattern for the first component carrier but no measurement gap pattern is used for the second component carrier.

10. A wireless device, comprising:
wireless communication circuitry; and
at least one processor coupled to the wireless communication circuitry, wherein the at least one processor is configured to cause the wireless device to perform operations, the operations comprising:
establishing communication with a cellular network using at least a first component carrier and a second component carrier of a plurality of component carriers, wherein the first component carrier is configured with a first plurality of BWPs (BWPs), including a first BWP and a second BWP, and wherein the second component carrier is configured with a second plurality of BWP, including a third BWP and a fourth BWP;
receiving signaling specifying a plurality of measurement gap patterns and an ON/OFF indication for respective BWPs of the first plurality of BWPs for the plurality of measurement gap patterns;
at a first time, performing one or more measurements using at least a first measurement gap pattern of the plurality of measurement gap patterns, wherein at the first time, communicating using the first component carrier uses the first BWP and communicating using the second component carrier uses the third BWP, wherein the first and third BWPs are active BWPs;
at a second time, changing the active BWP of the first component carrier from the first to the second BWP and communicating using the first component carrier using the second BWP;
in response to changing the active BWP from the first BWP to the second BWP, determining whether a second measurement gap pattern of the plurality of measurement gap patterns is active, wherein the second measurement gap pattern is active when it corresponds to an ON indication in any active BWP of the plurality of BWPs of the plurality of component carriers; and when the second measurement gap pattern is determined to be active, performing one or more measurements using at least the second measurement gap pattern.

11. The wireless device of claim 10,
wherein the signaling specifying the plurality of measurement gap patterns specifies an ON indication for the first measurement gap pattern for the first BWP, and an ON indication for the second measurement gap pattern for the second BWP.

12. The wireless device of claim 10, the operations further comprising:
at a third time, communicating using the second component carrier using the fourth BWP;
in response to changing from using the third BWP to using the fourth BWP, automatically switching from using a third measurement gap pattern to using a fourth measurement gap pattern based on the ON/OFF indication of the fourth measuring gap pattern; and
performing one or more measurements using the fourth measurement gap pattern.

13. The wireless device of claim 12,
wherein the signaling specifying the plurality of measurement gap patterns specifies an ON indication for the first measurement gap pattern for the first BWP, an ON indication for the second measurement gap pattern for the second BWP, an ON indication for the third measurement gap pattern for the third BWP, and an ON indication for the fourth measurement gap pattern for the fourth BWP;
the operations further comprising:
at the second time, communicating using the second component carrier using the fourth BWP;
in response to communicating using the first component carrier using the second BWP and communicating using the second component carrier using the fourth BWP, comparing the second measurement gap pattern and the fourth measurement gap pattern; and
based on said comparing the second measurement gap pattern and the fourth measurement gap pattern, determining to use the second measurement gap pattern for both the first component carrier and the second component carrier.

14. The wireless device of claim 13, wherein said comparing and said determining is performed by determining a highest measurement gap pattern overhead between the second measurement gap pattern and the fourth measurement gap pattern.

15. The wireless device of claim 13, the operations further comprising:
receiving a table indicating which measurement gap pattern to use for different activated BWPs;
wherein said comparing and said determining is performed based on the table.

16. A method, comprising:
establishing communication with a user equipment (UE), wherein the communication includes a first cell and a second cell;
configuring a plurality of bandwidth parts (BWPs) for the first cell, including a first BWP and a second BWP;
configuring a plurality of BWPs for the second cell, including a third BWP and a fourth BWP;
providing a measurement gap configuration to the UE, wherein the measurement gap configuration specifies a plurality of measurement gap patterns and an ON/OFF indication for respective BWPs of the plurality of BWPs for the plurality of measurement gap patterns;

at a first time, communicating with the UE using the first BWP for the first cell and the third BWP for the second cell, wherein said communicating at the first time is based on a first measurement gap pattern; and at a second time, communicating with the UE using the second BWP for the first cell, wherein said communicating at the second time is performed based on a determination that a second measurement gap pattern of the plurality of measurement gap patterns is active, wherein the second measurement gap pattern is active when it corresponds to an ON indication in any active BWP of the plurality of BWPs.

17. The method of claim 16, wherein communication over the first cell is performed by a first base station and wherein communication over the second cell is performed by a second base station.

18. The method of claim 16, wherein the measurement gap configuration specifies third and fourth measurement gap patterns for the third and fourth BWPs.

19. The method of claim 16, wherein the method further comprises disabling the first measurement gap pattern.

20. The method of claim 16, further comprising transmitting a table indicating which measurement gap pattern to use for different activated BWPs.

* * * * *

UNITED STATES PATENT AND TRADEMARK OFFICE
CERTIFICATE OF CORRECTION

PATENT NO. : 12,114,189 B2
APPLICATION NO. : 17/438172
DATED : October 8, 2024
INVENTOR(S) : Qiming Li et al.

It is certified that error appears in the above-identified patent and that said Letters Patent is hereby corrected as shown below:

In the Claims

Column 25, Line 42, in Claim 1, delete "BWPs (BWPs)" and substitute --bandwidth parts (BWPs)--.

Column 27, Line 40, in Claim 10, delete "BWPs (BWPs)" and substitute --bandwidth parts (BWPs)--.

Signed and Sealed this
Twelfth Day of November, 2024

Katherine Kelly Vidal
*Director of the United States Patent and Trademark Office*